United States Patent [19]
Linder et al.

[11] Patent Number: 5,606,856
[45] Date of Patent: Mar. 4, 1997

[54] ARRANGEMENT FOR AN AFTER TREATMENT OF EXHAUST GASES FROM AN INTERNAL COMBUSTION ENGINE

[75] Inventors: Ernst Linder, Muehlacker; Hubert Dettling, Waiblingen, both of Germany

[73] Assignee: Robert Bosch GmbH, Stuttgart, Germany

[21] Appl. No.: 560,142

[22] Filed: Nov. 17, 1995

[30] Foreign Application Priority Data

Nov. 19, 1994 [DE] Germany .......................... 44 41 261.4

[51] Int. Cl.⁶ ...................................................... F01N 3/00
[52] U.S. Cl. ................................................ 60/286; 60/301
[58] Field of Search ........................................ 60/286, 301

[56] References Cited

U.S. PATENT DOCUMENTS 4,403,473   9/1983   Gladden .
4,576,617   3/1986   Revevot ..................................... 60/286

OTHER PUBLICATIONS

Schadstoffreduzierung und Kraftstoffverbrauch von Pkw–Verbrennungsmotoren by F. Shaefer und R. van Basshysen/ p. 115.

Primary Examiner—John T. Kwon
Attorney, Agent, or Firm—Edwin E. Greigg; Ronald E. Greigg

[57] ABSTRACT

To reduce $NO_x$ components in the exhaust gas from a compression-ignition internal combustion engine with the aid of a reducing catalytic converter, a metering device for the supply of reducing agent to be additionally introduced into the exhaust gas, in the form of fuel, is provided to improve the performance of the catalytic converter. For this purpose, use is made of a positive displacement pump designed to meter very small quantities with a helix in the form of a helical groove arranged on a cylindrical body of revolution, the delivery rate being varied by driving the body of revolution at a variable rotational speed.

23 Claims, 2 Drawing Sheets

ARRANGEMENT FOR AN AFTER TREATMENT OF EXHAUST GASES FROM AN INTERNAL COMBUSTION ENGINE

PRIOR ART

Due to the fact that they are operated with a large excess of air, the exhaust gases of compression-ignition internal combustion engines tend toward a high $NO_x$ emission. This occurs to a greater degree in the case of internal combustion engines with direct injection into the combustion space. In order to reduce this emission, one possibility is to perform $NO_x$ reduction with the aid of a corresponding reducing catalytic converter. Suitable catalysts for this purpose are, for example, those based on zeolites. Another problem of compression-ignition internal combustion engines lies in the relatively low exhaust-gas temperature, which makes light-off of the reduction function of such a catalytic converter more difficult. To promote this reduction process, it has also already been proposed to connect the exhaust system to a burner which heats up the exhaust gases. To promote the reduction process, a proposal has already been made for an arrangement which will be described herein after.

In such an arrangement, known from the publications by F. Schäfer and R. Van Basshoysen entitled "Schadstoffreduzierung und Kraftstoffverbrauch yon PKW-Verbrennungsmotoren" [Pollutant reduction and fuel consumption in passenger-vehicle engines], page 115, published by Springer-Verlag, urea in aqueous solution is provided as the reducing agent and this is fed to the exhaust system upstream of the catalytic converter. This urea is here metered in in a complicated manner by means of a solenoid valve which is subject to the high operating temperatures in the region of the exhaust system-and therefore tends to stick. The provision and control of this solenoid valve for metering in small amounts—in the range of 1.5 milligrams per working cycle of the internal combustion engine—is very expensive. Particularly for metering in the urea dispensed by the solenoid valve, the provision of compressed air is required, said compressed air on the one hand transporting to the exhaust system the urea metered in and on the other hand being used to generate pressure in order to raise the urea storage tank to the pressure required for injection at the solenoid valve. To ensure accuracy of metering, this pressure must be regulated. The pressure drop across the solenoid valve must furthermore guarantee the finely dispersed preparation of the urea, such that the $NH_3$ required for the desired reduction of the $NO_x$ components in the exhaust gas will be formed at the latest in the catalytic converter by decomposition of the urea compound in conjunction with the action of heat.

This arrangement is very complex and requires a high exhaust-gas temperature to ensure that the reduction process is reliably carried out. There is the risk that, given an oversupply of urea and the absence of the operating requirements at the catalytic converter, the urea will not be completely converted and will thus pollute the environment as a component of the emissions.

EP-A-503 882 has furthermore disclosed the use of HC, i.e. fuel, as a reducing agent, this being introduced into the exhaust system of the internal combustion engine upstream of a $NO_x$ reducing catalytic converter of the zeolite type in a manner controlled by the temperature of the catalytic converter. Here, the metered addition is intermittent, the intention being that HC should be temporarily stored in the porous structure of the catalyst so that this HC is available for the conversion of $NO_x$ as the temperature of the catalytic converter rises. In addition to the disadvantageous use, already described above, of a solenoid valve and the associated expense, this arrangement has the disadvantage that the quantity of HC introduced cannot immediately bring about conversion of the $NO_x$ components but must first of all be prepared in the catalytic converter. This may well be achievable in the case of the envisaged application of the known arrangement to an applied-ignition internal combustion engine, which, as is known, has high exhaust-gas temperatures. In the case of the relatively cooler exhaust gases of a compression-ignition internal combustion engine, this measure is inadequate.

ADVANTAGES OF THE INVENTION

In contrast, the arrangement according to the invention has the advantage that a simple metering device, the design of which avoids involved cooling because of the continuous delivery, is provided for use with compression-ignition internal combustion engines. This continuous supply also allows simple and easily controlled preparation of the reducing agent introduced. The arrangement according to the invention is simple to control and inexpensive and is suitable for metering very small quantities while avoiding high delivery pressures.

A particularly advantageous construction of the metering device is set forth herein. In a further development in accordance with the invention, the metered reducing agent introduced is, prepared in an optimum manner before it is fed essentially in vapour form to the exhaust-gas stream. For this purpose, it is advantageous that, on the one hand, an additional air stream is provided and, on the other hand, that the swirl chamber is in thermally conductive connection with the exhaust-gas collecting system. However, it is, in particular, the refinement set forth which serves for the intensive preparation of the reducing agent introduced, the refinement of the discharge tube advantageously serving the unhindered introduction and fine distribution of the prepared reducing agent in the exhaust-gas stream. By virtue of the fact that, the outlet openings are oriented downstream, the formation of a reduced pressure at the flow resistance is used to provide a delivery pressure difference. In particular, the increased turbulence which occurs downstream of the discharge tube is used for the rapid, uniform dispersal of the reducing agent introduced. Since at temperatures outside the effective operating range of the catalytic converter conversion of the reducing agent cannot take place to the desired degree, the introduction of the reducing agent is limited to the temperature range which corresponds to the active operating range of the catalytic converter. This offers the advantage that any quantities of reducing agent which settle on the discharge tube are converted or burnt off at the higher temperatures of the full-load range and in the high-speed range. In order to avoid deposits, especially when switching off the internal combustion engine, the air pump is operated in accordance with Patent Claim 8. The catalytic converter still has a sufficient temperature immediately after switching off to convert the reducing-agent components introduced in this way into harmless emission components. To improve $NO_x$ reduction, especially at low exhaust-gas temperatures. This device can advantageously be supplied at the same time by the air pump already provided for the introduction of a reducing agent. An oxidizing catalytic converter for the reoxidation of as yet unburnt components is advantageously provided after the reducing catalytic converter. As the reducing agent, use is advantageously made of fuel, which is available with the associated internal combustion engine, that is, in particular, diesel fuel. This diesel fuel is also used to supply the combustion device.

BRIEF DESCRIPTION OF THE DRAWINGS

An exemplary embodiment of the invention is illustrated in the drawing and is explained in greater detail in the description which follows.

DESCRIPTION OF THE EXEMPLARY EMBODIMENT

Figure 1:
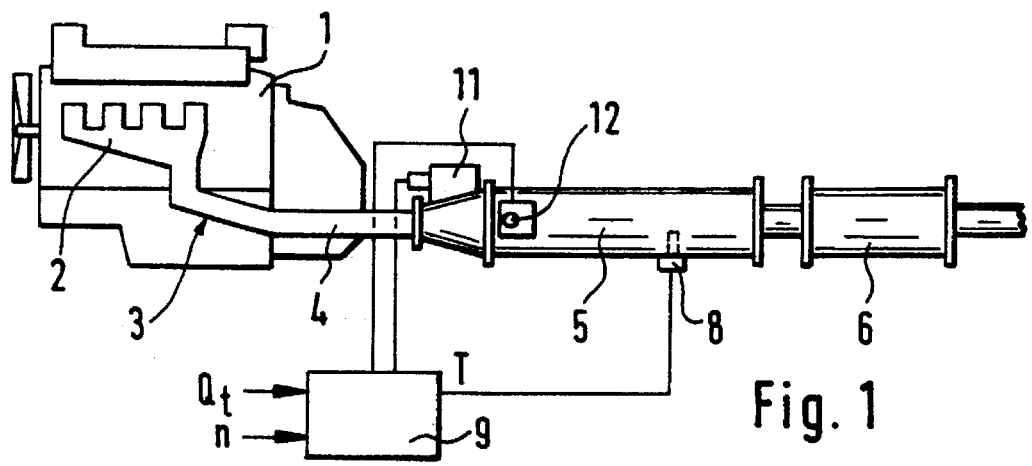
FIG. 1 shows an overall view of an internal combustion engine, a reducing catalytic converter and an oxidation catalytic converter arranged downstream of the latter.

FIG. 1 shows, schematically, an internal combustion engine 1 in the form of a compression-ignition internal combustion engine or diesel engine. The exhaust-gas collecting system 3 of this engine comprises what is referred to as the exhaust manifold 2, through which the exhaust gases from the individual cylinders are fed to a common exhaust pipe 4. Provided in the latter, as close as possible to the internal combustion engine 1, is a reducing catalytic converter 5 for the purpose of reducing $NO_x$ components in the exhaust gas and, arranged downstream of the said reducing catalytic converter, an oxidation catalytic converter 6 for the purpose of reoxidizing unburnt exhaust emission components such as HC or CO with residual oxygen. A temperature sensor 8 is provided in the reducing catalytic converter to measure the temperature of the latter and is connected to a control device 9. This control device is furthermore connected to a burner 11 and a metering device 12, which are controlled by the control device 9 in accordance with the temperature T of the catalytic converter and further operating parameters of the internal combustion engine such as, for example, the load Q+ and engine speed n.

To maintain the temperature of the exhaust gases, which, in the case of the compression-ignition internal combustion engine (diesel engine), is relatively low in comparison with applied-ignition internal combustion engines (Otto engines), the exhaust manifold is preferably thermally insulated, this being accomplished in a particularly effective manner by means of a double wall enclosing an air or gas cushion. The downstream exhaust pipe 4 can also be insulated in this way in order as far as possible to maintain the exhaust-gas temperature until it enters the reducing catalytic converter 5.

Figure 4:
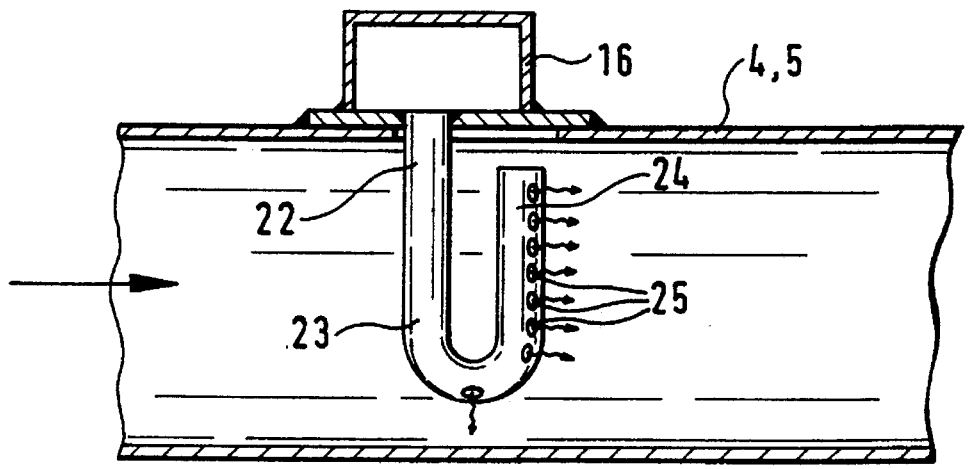
FIG. 4 shows a section along the line IV—IV through FIG. 2.
Figure 2:
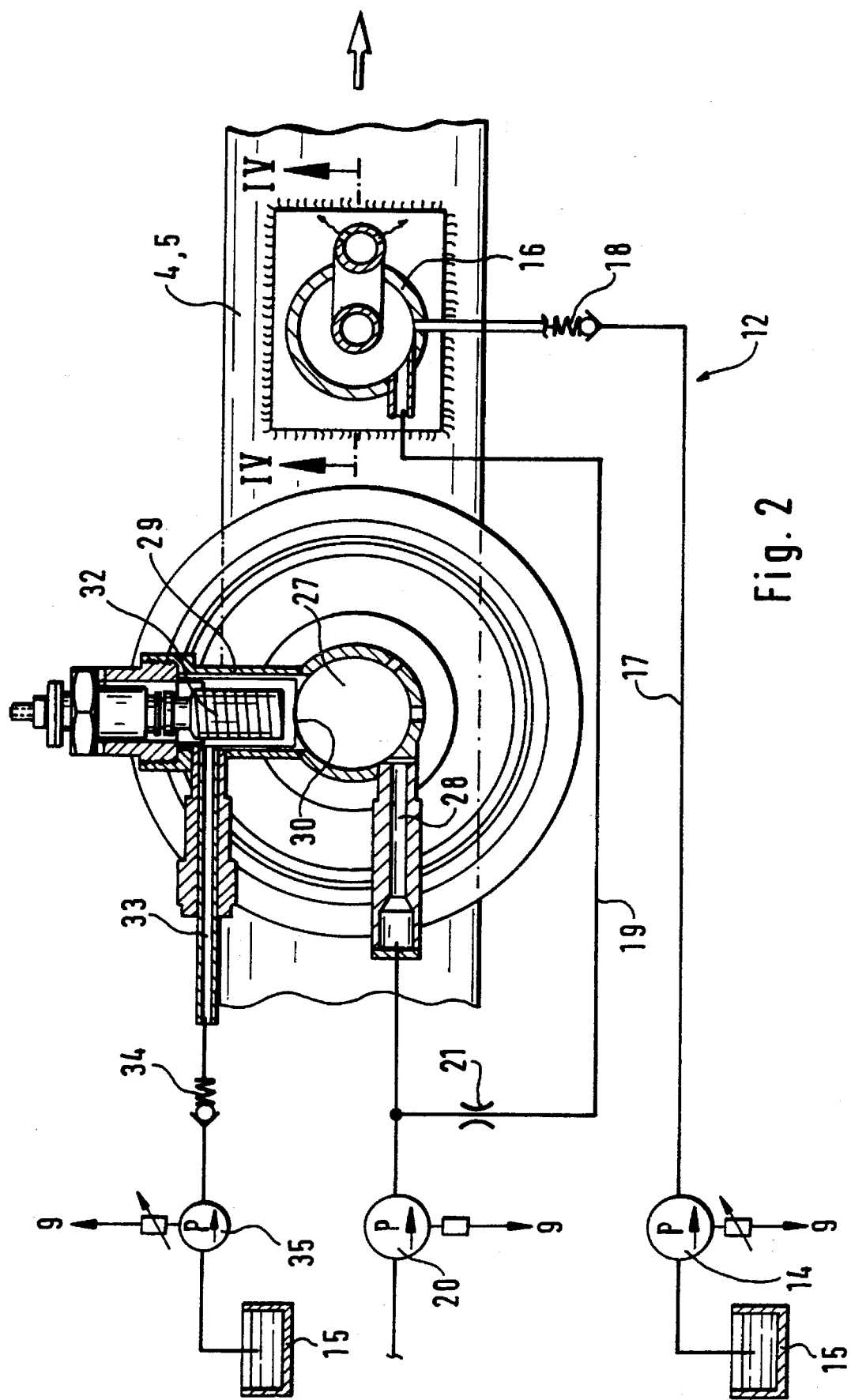
FIG. 2 shows the arrangement according to the invention in schematic representation in conjunction with a combustion device that serves to heat the exhaust gases.

The configuration of the burner and the metering device can be seen more clearly from the schematic illustration in FIGS. 2 and 4. FIG. 2 shows a pipe which represents the exhaust pipe 4 directly upstream of the catalytic converter or of the inlet region of the catalytic converter 5. Details will first of all be given of the metering device 12, which is arranged either just in front of the inlet of the reducing catalytic converter 5 on the exhaust-gas-carrying part or in the inlet region of the reducing catalytic converter 5 itself. By means of this metering device, a reducing agent is fed to the exhaust gas, the reducing agent in the present case preferably being diesel fuel from the associated diesel internal combustion engine. The supply of this reducing agent is intended to assist the reducing catalytic converter 5 in reducing $NO_x$ components in the exhaust gas. As already mentioned above, these $NO_x$ components are particularly high in the case of diesel internal combustion engines, which are operated with a large excess of oxygen. On the other hand, the ability to function of a reducing catalytic converter is also dependent on its having a sufficient operating temperature and this, in turn, is made more difficult given the relatively cold exhaust gases of the diesel internal combustion engine. The supply of a reducing agent improves the operation of the catalytic converter or indeed makes it possible in the first place. On the one hand, the oxidation of the hydrocarbons within the catalytic converter makes it possible to increase the temperature of the catalytic converter and, on the other hand, reducing components in the form of CO which are formed can bring about by this combustion the reduction of the $NO_x$ compounds under the catalytic action.

In order to ensure adequate functioning and also to avoid excessive fuel consumption, good metering of the reducing agent to be introduced is required and this is accomplished by means of the metering device 12. This metering device comprises a positive displacement pump 14 which delivers very small quantities, pumping fuel out of a fuel tank 15 at a low delivery pressure to a swirl chamber 16. The delivery pressure is in the region of 0.45 bar. The delivery line 17 leading to the swirl chamber contains a delivery non-return valve 18 in order to avoid reactive effects of the exhaust system on the positive displacement pump 14. The positive displacement pump 14 is controlled by the control unit 9 in such a way that it is driven with a variable rotational speed as a function of operating parameters of the internal combustion engine which are stored in a characteristic map. The delivery rate and hence the continuously metered quantity of fuel per unit time varies in accordance with this rotational speed. The swirl chamber 16, which is also illustrated in FIG. 4, in section, is of circular-cylindrical configuration with a delivery line 17 open perpendicularly to the inner wall. An air feed line 19 furthermore opens tangentially into the swirl chamber such that the entry of the delivery line 17 lies just downstream of the entry of the air feed line. The air feed line is supplied by an air pump 20 which operates approximately at 0.25 bar delivery pressure but can, in particular, likewise be regulated in its rotational speed or delivery rate as a function of a characteristic map by the control unit 9. A restrictor 21 is arranged in the air feed line 18 to limit the delivery rate.

From the section through the swirl chamber shown in FIG. 4, it can be seen that leading off coaxially from the swirl chamber 16 there is a discharge tube 22 which plunges vertically into the exhaust pipe 4 or the reducing catalytic converter 5. For good heat transfer, the swirl chamber is connected directly to the wall of the exhaust pipe 4, 5. The discharge tube has the shape of a U with a first arm 23, which starts from the swirl chamber 16 and lies upstream relative to the flow of exhaust gas, and a second arm 24, which lies downstream of the first arm 23. The second arm is closed at the end and has outlet openings 25 on its outermost, downstream lateral surface.

In operation, compressed air is introduced into the swirl chamber by the air pump 20, such that a strongly rotary air flow arises in the swirl chamber, from which the air then enters the discharge tube 23. This strongly rotary air flow ensures that the fuel quantities delivered by the positive displacement pump 14 are finely dispersed, ensuring that, when the air enters the discharge tube 23, it is mixed uniformly with finely dispersed fuel. Even in the swirl chamber itself, the inflowing air can be heated on the walls of the closed cylindrical swirl chamber together with the fuel introduced. The heating is then increased in the discharge tube, which is heated by the exhaust gases, such that the fuel emerges at the outlet openings 25 having mixed with air very largely in gas form and is then fed directly to the reducing catalytic converter 5.

To improve operation by raising the exhaust-gas temperature, the abovementioned insulation of the exhaust-gas-carrying parts up to the reducing catalytic converter is advantageous. It is furthermore advantageous, particularly for the starting phase of the internal combustion engine, until relatively high exhaust-gas temperatures are reached at a high load, to provide the abovementioned burner 11 upstream of the metering device or upstream of the discharge tube 22. This burner can, for example, be, as shown, a device already developed in the form of burner designs for clearing particulate filters. For this purpose, attention is drawn, for example, to burner devices such as those disclosed in German Offenlegungsschrift 3,732,491, 3,732,492 and 3,903,065. Other burner designs or heating devices operating, for example, with electric heating can also be used. Such a burner has a cylindrical combustion chamber 27 which is closed at one end, is open towards the exhaust system and into which a compressed-air line 28 opens tangentially. This opening lies near to the closed end of the combustion chamber. Also near to the closed end of the combustion chamber, the latter is connected to a cylindrical ignition chamber 29, which enters at right angles to the axis of the combustion chamber. As can be seen from the drawing, this chamber has an inlet opening 30 into the combustion chamber 27 and is closed from the end opposite this opening by a heater plug 32 screwed in there. Opening into the ignition chamber near to the point where the heater plug is screwed in is a fuel line 33, which contains a nonreturn valve 34 opening towards the ignition chamber 29 and is connected to a fuel pump 35 which draws in fuel from the fuel tank 15 and delivers it to the ignition chamber. The delivery rate of the fuel pump is advantageously controlled by regulating its rotational speed, which is in turn controlled by the control device 9. This is done, in particular, as a function of the speed of the internal combustion engine or the flow rate of exhaust gas in the exhaust system, derived from the various relevant parameters of the internal combustion engine. Moreover, here too temperature-dependent control is provided, such that the burner is only operated when an increase in the exhaust-gas temperature is required and, to control this exhaust-gas temperature, the burner is also operated at various powers. This permits fuel-saving operation of the internal combustion engine.

During the operation of the burner, the heater plug is first of all supplied with current and fuel is passed into the ignition chamber in the required quantity through the fuel line 33. Combustion air is simultaneously introduced into the combustion chamber 27 via the compressed-air line 28 and, owing to the tangential inflow, causes rotary flow in the combustion chamber. The fuel reaching the heater plug, the heater plug advantageously also having a heatable protective sleeve, vaporizes and mixes in the combustion cheer with combustion air. When the ignition temperature is reached, the fuel/air mixture ignites there and in part burns as it crosses into the exhaust system. The resulting exhaust gases and the thermal energy arising in the combustion chamber are transferred to the exhaust gases of the internal combustion engine and heat the exhaust gas. After a certain time, the combustion chamber reaches a temperature at which the fuel supplied can be ignited continuously. The heater plug is then switched off. To stabilize the temperature of the combustion chamber, this combustion chamber 27 can also be provided with a heater element, at which fuel and air together ignite.

The compressed-air line 28 is advantageously supplied with compressed air by the same air pump 20 used to supply the swirl chamber 16.

Figure 3:
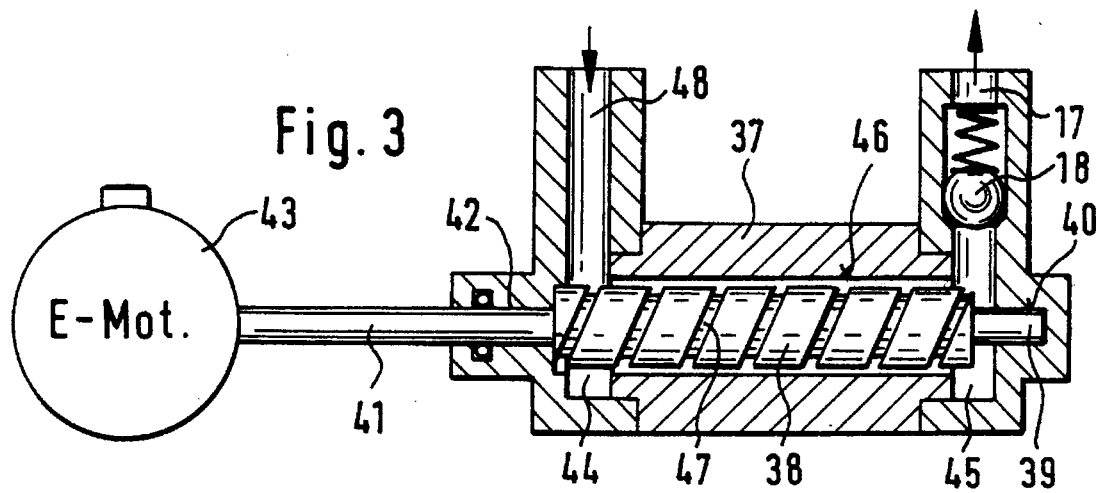
FIG. 3 shows the configuration of the positive displacement pump in accordance with the invention.

The construction of the positive displacement pump 14 shown in FIG. 2 is illustrated in FIG. 3. This is a pump of very simple construction comprising a circular-cylindrical housing 37 in which a cylindrical body of revolution 38 is mounted. At one end, the body of revolution has a bearing journal 39 which is supported in a corresponding bearing 40 at the end of the cylindrical housing 37. At the end lying axially opposite the bearing journal 39, the body of revolution 38 is connected to an input shaft 41, which is likewise supported in a bearing 42, the latter being designed as a through hole at the end of the housing 37. The input shaft is connected to an electric motor 33 which, as already explained above, is operated at a variable rotational speed controlled by the control device 9.

Machined into the curved surface of the body of revolution 38 is a worm-shaped or thread-shaped groove 47 which leads in the housing 37 from an entry point 44 at one end of the body of revolution 38 to an exit point 45 at the other end of the body of revolution. The entry point 44 of the housing 37 is provided with a larger diameter than that of the cylindrical housing bore 46 which surrounds the curved surface of the body of revolution in the intermediate region of the latter, and is connected to a fuel inlet line 48. This leads from the fuel tank to the positive displacement pump 14. The exit point 45, on the other hand, is connected to the delivery line 17 and is likewise widened in relation to the cylindrical housing bore 46. The nonreturn valve 18 is preferably provided near to the exit point 45 in this delivery line 17. When the body of revolution 38 is driven by the electric motor 43, the groove 47 takes fuel from the entry point and delivers it as far as the exit point 45. Since this groove 47 provides a constant cross-section of displacement, the delivery rate of the positive displacement pump 44 varies with the speed at which the body of revolution is driven. For a given opening pressure of the nonreturn valve 18 or backpressure in the swirl chamber 16, the quantity of fuel introduced into the swirl chamber per unit time thus varies with the rotational speed. The positive displacement pump shown here is of very simple construction and is easy to control. In particular, the small cross-section of displacement of the groove 47 makes it easy to meter in a very small quantity of fuel with precision by way of the rotational speed. This pump is thus advantageously suitable, in particular, for metering the required small quantities of fuel into the swirl chamber.

The foregoing relates to preferred exemplary embodiments of the invention, it being understood that other variants and embodiments thereof are possible within the spirit and scope of the invention, the latter being defined by the appended claims.

We claim:

1. An arrangement for an after-treatment of exhaust gases from a compression-ignition internal combustion engine, in an exhaust-gas collecting system (3) of which a reducing catalytic converter (5) for reducing $NO_x$ components of the exhaust gas from the internal combustion engine is arranged, a metering device (12) controlled by a control device (9) and serving for the metered introduction of a reducing agent into the stream of exhaust gas fed to the catalytic converter as a function of values, stored in a characteristic map, for the $NO_x$ content of the exhaust gas given various operating parameters of the internal combustion engine and of the catalytic converter, and with an air feed pump arranged upstream of the metering device and serving for the finely dispersed preparation of the reducing agent to be introduced, the metering device (12) comprises a continuous-delivery positive displacement pump (14) driven at a variable rotational speeds controlled by the control device (9).

2. An arrangement according to claim 1, in which the positive displacement pump (14) has a cylindrical body of revolution (38) which is mounted in a cylinder (46), is driven by an electric motor (43) and, on a curved surface, has at least one helix (47), which leads from a reducing-agent inlet opening (44) into the cylinder as far as a reducing-gent outlet opening (45) out of the cylinder (46), which reducing-agent outlet opening is connected to a reducing-agent introduction point (22) at the inlet of the catalytic converter.

3. An arrangement according to claim 2, in which the reducing agent is pumped by the positive displacement pump (14) into a swirl chamber (16) into which an additional air flow delivered by an air pump (20) is introduced tangentially, and the reducing agent is pumped via a line (17) entering perpendicularly to the introduced air flow into the swirl chamber (16), from which a discharge tube (22) with a plurality of outlet openings (25) leads into the exhaust-gas stream as a reducing-agent introduction point.

4. An arrangement according to claim 3, in which the swirl chamber (16) is in thermally conductive connection with the exhaust-gas collecting system (3).

5. An arrangement according to claim 2, in which the positive displacement pump (14) is controlled by the control device (9) that it is operated in the temperature range of the exhaust gas in the catalytic converter between 200°–400° C. during the operation of the internal combustion engine.

6. An arrangement according to claim 3, in which the discharge tube is of U-shaped design with a first arm (23) situated in an upstream position transversely to the exhaust-gas stream and branching off axially from the swirl chamber and with a second arm (24), which is closed at the end and has the outlet openings (25) in its lateral surface.

7. An arrangement according to claim 6, in which the outlet openings (25) are arranged on a downstream side of the second arm (24).

8. An arrangement according to claim 1, in which the reducing agent is pumped by the positive displacement pump (14) into a swirl chamber (16) into which an additional air flow delivered by an air pump (20) is introduced tangentially, and the reducing agent is pumped via a line (17) entering perpendicularly to the introduced air flow into the swirl chamber (16), from which a discharge tube (22) with a plurality of outlet openings (25) leads into the exhaust-gas stream as a reducing-agent introduction point.

9. An arrangement according to claim 8, in which the swirl chamber (16) is in thermally conductive connection with the exhaust-gas collecting system (3).

10. An arrangement according to claim 8, in which the discharge tube is of U-shaped design with a first arm (23) situated in an upstream position transversely to the exhaust-gas stream and branching off axially from the swirl chamber and with a second arm (24), which is closed at the end and has the outlet openings (25) in its lateral surface.

11. An arrangement according to claim 10, in which the outlet openings (25) are arranged on a downstream side of the second arm (24).

12. An arrangement according to claim 11, in which the positive displacement pump (14) is controlled by the control device (9) that it is operated in the temperature range of the exhaust gas in the catalytic converter between 200°–400° C. during the operation of the internal combustion engine.

13. An arrangement according to claim 9, in which the positive displacement pump (14) is controlled by the control device (9) that it is operated in the temperature range of the exhaust gas in the catalytic converter between 200°–400° C. during the operation of the internal combustion engine.

14. An arrangement according to claim 10, in which the positive displacement pump (14) is controlled by the control device (9) that it is operated in the temperature range of the exhaust gas in the catalytic converter between 200°–400° C. during the operation of the internal combustion engine.

15. An arrangement according to claim 8, in which the positive displacement pump (14) is controlled by the control device (9) that it is operated in the temperature range of the exhaust gas in the catalytic converter between 200°–400° C. during the operation of the internal combustion engine.

16. An arrangement according to claim 1, in which the positive displacement pump (14) is controlled by the control device (9) that it is operated in the temperature range of the exhaust gas in the catalytic converter between 200°–400° C. during the operation of the internal combustion engine.

17. An arrangement according to claim 16, in which the air pump is likewise controlled as a function of operating parameters of the internal combustion engine, in accordance with an introduction of quantities of a reducing agent.

18. An arrangement according to claim 1, in which when the internal combustion engine is switched off, the air feed pump continues to be operated for a certain time.

19. An arrangement according to claim 1, in which a combustion device (11) controlled in a combustion rate as a function of operating parameters of the internal combustion engine, including the temperature one of of the exhaust gas and of the reducing catalytic converter, by means of which fuel together with air is burnt, and the exhaust gases from this combustion device are fed to the exhaust gas of the internal combustion engine upstream of the introduction point (22) for the reducing agent.

20. An arrangement according to claim 19, in which the air pump (20) at the same time also supplies the combustion device (11) with compressed air.

21. An arrangement according to claim 20, in which the device for reoxidation is an oxidizing catalytic converter (6).

22. An arrangement according to claim 1, in which an oxidizing device (6) for reoxidizing the exhaust gas is provided in the exhaust-gas collecting system downstream of the catalytic converter.

23. An arrangement according to claim 1, in which fuel is used as the reducing agent, and the combustion device is likewise operated with this fuel.

* * * * *